(12) United States Patent
Kojima et al.

(10) Patent No.: US 7,794,093 B2
(45) Date of Patent: Sep. 14, 2010

(54) PROJECTION DISPLAY APPARATUS

(75) Inventors: Kuniko Kojima, Tokyo (JP); Tomohiro Sasagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 710 days.

(21) Appl. No.: 11/826,506

(22) Filed: Jul. 16, 2007

(65) Prior Publication Data

US 2008/0049197 A1 Feb. 28, 2008

(30) Foreign Application Priority Data

Aug. 25, 2006 (JP) ............................. 2006-229193

(51) Int. Cl.
*G03B 21/28* (2006.01)
*G03B 21/22* (2006.01)
*G02B 5/12* (2006.01)
*G02B 27/46* (2006.01)

(52) U.S. Cl. .................... 353/98; 353/122; 385/133; 385/901; 362/551; 362/559

(58) Field of Classification Search ................ 353/98, 353/102, 122; 385/122, 133, 901; 362/551, 362/552, 559
See application file for complete search history.

(56) References Cited

U.S. PATENT DOCUMENTS 6,517,210 B2 * 2/2003 Peterson et al. ............... 353/98
6,969,177 B2 * 11/2005 Li et al. ....................... 362/19

FOREIGN PATENT DOCUMENTS

| JP | 2002-287085 A | 10/2002 |
| JP | 2003-149597 A | 5/2003 |
| JP | 2004-126203 A | 4/2004 |
| JP | 2004-252112 A | 9/2004 |
| JP | 2005-49491 A | 2/2005 |
| JP | 2005-128234 A | 5/2005 |
| JP | 3715295 B2 | 9/2005 |
| JP | 2006-189551 A | 7/2006 |

* cited by examiner

*Primary Examiner*—Georgia Y Epps
*Assistant Examiner*—Danell L Owens
(74) *Attorney, Agent, or Firm*—Birch, Stewart, Kolasch & Birch, LLP

(57) ABSTRACT

A projection display apparatus includes a light source, a light intensity equalizing element, a reflective light valve, a relay optical system, and a projecting optical system; the light intensity equalizing element being an optical device in which a cross-sectional shape in a direction orthogonal to a central axis of the light has four corners; the cross-sectional shape of the light intensity equalizing element being determined in accordance with a rectangular ideal illumination area determined so as to include the image forming area on the reflective light valve, an illumination area on the reflective light valve when a reference light intensity equalizing element is assumed to be used, the reference light intensity equalizing element being rectangular in a cross-sectional shape in a direction orthogonal to the central light ray, and the cross-sectional shape of the reference light intensity equalizing element.

7 Claims, 7 Drawing Sheets

PROJECTION DISPLAY APPARATUS

BACKGROUND OF THE INVENTION

1. Field of the Invention

The present invention relates to a projection display apparatus for projecting an mage onto a screen and, in particular, to a projection display apparatus using a reflective light valve such as a Digital Micromirror Device (hereinafter referred to as "DMD") and a reflective liquid crystal display device.

2. Description of the Related Art

Some conventional projection display apparatuses employ a construction in which light emitted from a light source is led to a light valve through a light tunnel (i.e., a cylindrical optical device). For example, see paragraph 0034 and FIG. 2 of Japanese Patent Application Kokai (Laid-Open) Publication No. 2004-252112 (Patent Document 1). This light tunnel has a tapered portion formed on an incident side so as to continuously decrease the cross sectional area of the tapered portion and a parallel portion formed on an emitting side so as to make the cross-sectional shape of the parallel portion constant. The shape of the cross-sectional shape of the parallel portion and the shape of an emitting end of the light tunnel are formed so as to be similar to the shape (rectangle) of the light valve.

Moreover, there is also proposed a projection display apparatus that determines the positions of corners of the cross-sectional shape of a light intensity equalizing element which equalizes light from a light source in accordance with the positions of corners of a reflective light valve. For example, see Japanese Patent Application Kokai (Laid-Open) Publication No. 2006-189551 (Patent Document 2).

However, for example, when the incident surface (hereinafter referred to as a "surface to be illuminated" or an "image forming area") of the light valve is not vertically irradiated with light, even if the cross-sectional shape of a light intensity equalizing element is made similar to the shape of the incident surface of the light valve, there is presented a problem that an area actually illuminated (hereinafter referred to as an "actual illumination area") on the light valve is different in shape from the incident surface of the light valve. This problem is often raised in a case where the incident surface of the light valve cannot be vertically irradiated with the light because of the construction of an optical system, for example, in a case where because of the use of a reflective light valve, a mirror for introducing light to the reflective light valve and a projecting optical system which magnifies and projects the light reflected by the reflective light valve are arranged adjacently to each other.

In the Patent Document 2, the positions of portions (i.e., sides) between the neighboring corners of the cross-sectional shape (or an emitting end surface) of the light intensity equalizing element which equalizes the light from the light source are not specified, so depending on the construction of a projecting optical system, it can be also thought that areas in the vicinity of the middle points of the portions (i.e., sides) between the neighboring corners of the image forming area of the reflective light valve are not suitably illuminated.

SUMMARY OF THE INVENTION

It is therefore an object of the present invention to provide a projection display apparatus capable of improving light use efficiency and uniformity in an illuminance distribution by the use of a light intensity equalizing element having a cross-sectional shape capable of making the shape of an actual illumination area on a reflective light valve approximately coincide with the shape of an ideal illumination area.

According to the present invention, a projection display apparatus includes a light source; a light intensity equalizing element which equalizes an intensity distribution of light emitted from the light source; a reflective light valve having a rectangular image forming area; a relay optical system which introduces the light emitted from the light intensity equalizing element into the reflective light valve; and a projecting optical system which magnifies and projects an image formed in the image forming area of the reflective light valve. The light intensity equalizing element is an optical device in which a cross-sectional shape in a direction orthogonal to a central axis of the light has four corners. The cross-sectional shape of the light intensity equalizing element is determined in accordance with a rectangular ideal illumination area determined so as to include the image forming area on the reflective light valve, an illumination area on the reflective light valve when a reference light intensity equalizing element is assumed to be used, the reference light intensity equalizing element being rectangular in a cross-sectional shape in a direction orthogonal to the central light ray, and the cross-sectional shape of the reference light intensity equalizing element; wherein following equations are satisfied $$0.9 \times (|Xa1|/|Xa2|) < (|Xa4|/|Xa3|) < 1.25 \times (|Xa1|/|Xa2|)$$

$$0.9 \times (|Xb1|/|Xb2|) < (|Xb4|/|Xb3|) < 1.25 \times (|Xb1|/|Xb2|)$$

$$0.9 \times (|Xc1|/|Xc2|) < (|Xc4|/|Xc3|) < 1.25 \times (|Xc1|/|Xc2|)$$

$$0.9 \times (|Xf1|/|Xf2|) < (|Xf4|/|Xf3|) < 1.25 \times (|Xf1|/|Xf2|)$$

$$0.9 \times (|Xg1|/|Xg2|) < (|Xg4|/|Xg3|) < 1.25 \times (|Xg1|/|Xg2|)$$

$$0.9 \times (|Xh1|/|Xh2|) < (|Xh4|/|Xh3|) < 1.25 \times (|Xh1|/|Xh2|)$$

$$0.9 \times (|Ya1|/|Ya2|) < (|Ya4|/|Ya3|) < 1.25 \times (|Ya1|/|Ya2|)$$

$$0.9 \times (|Yc1|/|Yc2|) < (|Yc4|/|Yc3|) < 1.25 \times (|Yc1|/|Yc2|)$$

$$0.9 \times (|Yd1|/|Yd2|) < (|Yd4|/|Yd3|) < 1.25 \times (|Yd1|/|Yd2|)$$

$$0.9 \times (|Ye1|/|Ye2|) < (|Ye4|/|Ye3|) < 1.25 \times (|Ye1|/|Ye2|)$$

$$0.9 \times (|Yf1|/|Yf2|) < (|Yf4|/|Yf3|) < 1.25 \times (|Yf1|/|Yf2|)$$

$$0.9 \times (|Yh1|/|Yh2|) < (|Yh4|/|Yh3|) < 1.25 \times (|Yh1|/|Yh2|)$$

where, in a coordinate system having an origin at a center of the image forming area of the reflective light valve and taking an x axis and a y axis in a horizontal scanning direction and in a vertical scanning direction respectively, (Xa1, Ya1), (Xc1, Yc1), (Xf1, Yf1), and (Xh1, Yh1) are coordinates of corners of the ideal illumination area on the reflective light valve respectively, (Xb1, Yb1), (Xd1, Yd1), (Xe1, Ye1), and (Xg1, Yg1) are coordinates of middle points of sides of the ideal illumination area on the reflective light valve respectively, (Xa2, Ya2), (Xc2, Yc2), (Xf2, Yf2), and (Xh2, Yh2) are coordinates of corners of an actual illumination area on the reflective light valve respectively, when the reference light intensity equalizing element is assumed to be used, (Xb2, Yb2), (Xd2, Yd2), (Xe2, Ye2), and (Xg2, Yg2) are coordinates of middle points of sides of the actual illumination area on the reflective light valve respectively, when the reference light intensity equalizing element is assumed to be used, (Xa3, Ya3), (Xc3, Yc3), (Xf3, Yf3), and (Xh3, Yh3) are coordinates of corners of a cross-sectional shape of the reference light intensity equalizing element respectively, (Xb3, Yb3), (Xd3, Yd3), (Xe3, Ye3), and (Xg3, Yg3) are coordinates of middle points of sides of the cross-sectional shape of the reference light intensity equalizing element respectively, (Xa4, Ya4), (Xc4, Yc4), (Xf4, Yf4), and (Xh4, Yh4) are coordinates of corners of a cross-sectional shape of the light intensity equalizing element respectively, and (Xb4, Yb4), (Xd4, Yd4), (Xe4, Ye4), and (Xg4, Yg4) are coordinates of middle points of sides of the cross-sectional shape of the light intensity equalizing element respectively.

In the present invention, the cross-sectional shape of the light intensity equalizing element is determined in accordance with: an ideal illumination area including an image forming area on a reflective light valve; an illumination area on the reflective light valve when a reference light intensity equalizing element is assumed to be used, the reference light intensity equalizing element being rectangular in a cross-sectional shape in a direction orthogonal to a central light ray; and the cross-sectional shape of the reference light intensity equalizing element. For this reason, according to the present invention, even when the image forming area on the reflective light valve cannot be vertically irradiated with light, the actual illumination area by the light, with which the reflective light valve is irradiated, can be made to approximately coincide with the ideal illumination area. Hence, there is produced the effect of improving light use efficiency and uniformity in an illuminance distribution.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
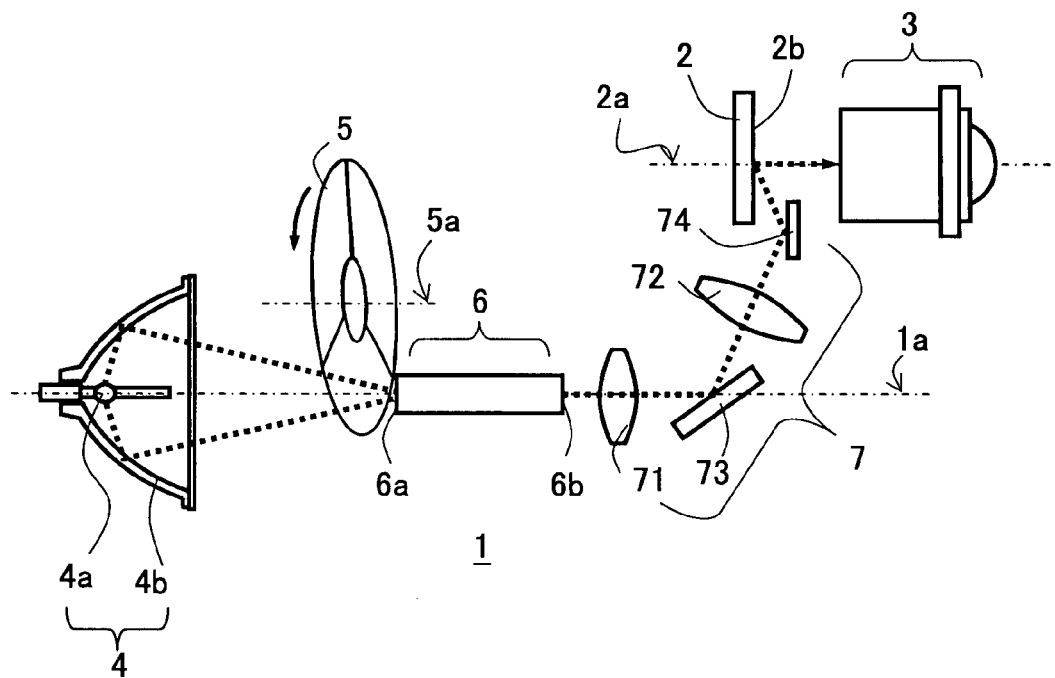
FIG. 1 is a diagram schematically showing a configuration of a projection display apparatus according to the first embodiment of the present invention.

FIG. 1 is a diagram schematically showing a configuration of an optical system of a projection display apparatus according to the first embodiment of the present invention.

As shown in FIG. 1, the projection display apparatus according to the first embodiment includes an illumination optical system 1, a DMD element 2 as a reflective light valve, and a projecting optical system 3 for projecting an image, which is formed on a surface to be illuminated (i.e., an image forming area) 2b of the DMD element 2 illuminated by the illumination optical system 1, onto a screen (not shown). The illumination optical system 1 is an optical system for projecting light onto the surface to be illuminated 2b of the DMD element 2. The illumination optical system 1 includes a light source lamp unit 4, a rotary color filter 5 that transmits light of a specified wavelength band of light emitted from the light source lamp unit 4, a light intensity equalizing element 6 which equalizes an intensity distribution in a cross sectional plane (i.e., a plane orthogonal to a central light ray) of the light passing through the rotary color filter 5, relay lenses 71 and 72, a first mirror 73, and a second mirror 74. The relay lenses 71 and 72, the first mirror 73, and the second mirror 74 constitute a relay optical system 7 for introducing the light emitted from the light intensity equalizing element 6 to the DMD element 2.

The light source lamp unit 4 includes, for example, a light emitting body 4a which emits white light and an ellipsoidal mirror 4b disposed around the light emitting body 4a. The ellipsoidal mirror 4b reflects light emitted from a first focal point corresponding to a first center of an ellipse of the ellipsoidal mirror 4b and focuses the reflected light on a second focal point corresponding to a second center of the ellipse. The light emitting body 4a is disposed at or in the vicinity of the first focal point of the ellipsoidal mirror 4b so that the light emitted from the light emitting body 4a is focused on or in the vicinity of the second focal point of the ellipsoidal mirror 4b. A parabolic mirror may be used in place of the ellipsoidal mirror 4b. In this case, the light emitted from the light emitting body 4a is made approximately parallel light by the parabolic mirror and then the parallel light is focused by a condenser lens (not shown in the figure). Moreover, a concave mirror other than the parabolic mirror can be also used in place of the ellipsoidal mirror 4b.

In the rotary color filter 5, a disk-shaped member is divided into, for example, three fan-shaped portions which form three filter areas of red, green, and blue, respectively. The three filter areas of red, green, and blue transmit only light corresponding to wavelength bands of red, green, and blue, respectively. The rotary color filter 5 is constructed in such a way that the rotary color filter 5 is rotated around an axis 5a approximately parallel to an illumination optical axis 1a and the respective filter areas are located on or in the vicinity of the second focal point of the ellipsoidal mirror 4b on the illumination optical axis 1a of the light source lamp unit 4. When the rotary color filter 5 is rotated in synchronization with an image signal, the DMD element 2 is irradiated in sequence (i.e., field sequentially) with red light, green light, and blue light.

The light intensity equalizing element 6 has a function of equalizing a light intensity (i.e., reducing variations in illuminance) in the cross sectional plane (i.e., in a plane orthogonal to a central light ray advancing on the illumination optical axis 1a) of the light passing through the rotary color filter 5. The light intensity equalizing element 6 is generally made of a transparent material such as glass or resin and includes a polygonal pillar-shaped rod (i.e., a pillar-shaped member having a polygonal cross-sectional shape) constructed in such a way that internal surfaces of the side walls of the polygonal pillar-shaped rod form total reflecting surfaces, or a polygonal pipe (i.e., a tubular member) having parts combined with each other into the shape of a cylinder with their light reflecting surfaces disposed inside and having a polygonal cross-sectional shape. When the light intensity equalizing element 6 is the polygonal pillar-shaped rod, light is reflected a plurality of times by the total reflection at an interface between the transparent material and air and then is emitted from an emitting end of the polygonal pillar-shaped rod. When the light intensity equalizing element 6 is the polygonal pipe, light is reflected a plurality of times by reflection by surface mirrors directed inside and then is emitted from an emitting opening. When the light intensity equalizing element 6 has an appropriate length in a direction in which the light advances, light reflected in the interior of the light intensity equalizing element 6 a plurality of times is directed in a superimposing manner near the emitting end 6b of the light intensity equalizing element 6, whereby light having an approximately uniform light intensity distribution can be produced at or in the vicinity of the emitting end 6b of the light intensity equalizing element 6. The light having the approximately uniform light intensity distribution and emitted from the emitting end 6b is introduced to the DMD element 2 by the relay optical system 7 which includes the relay lenses 71 and 72, the first mirror 73, and the second mirror 74, whereby the surface to be illuminated 2b of the DMD element 2 is irradiated with the light.

Figure 2:
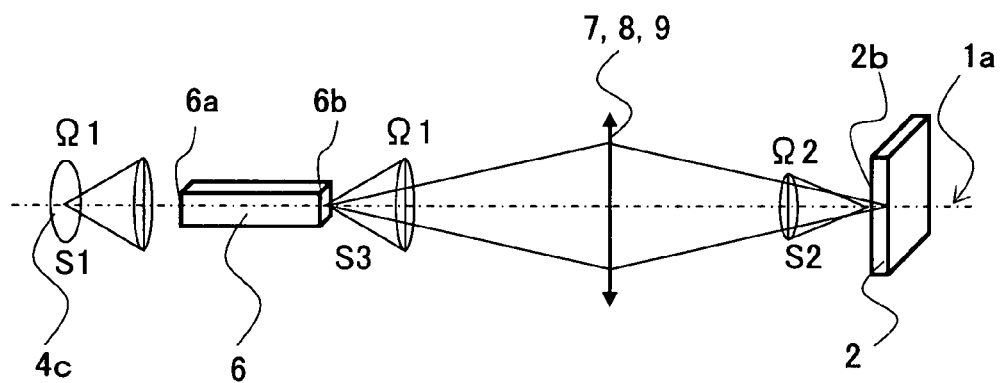
FIG. 2 is a diagram conceptually showing relationship between a light source plane, a light intensity equalizing element, and a DMD element of the first embodiment.

FIG. 2 is a schematic diagram conceptually showing the relationship between a light source image 4c formed by the light source 4, the light intensity equalizing element 6, and the DMD element 2. In the first embodiment, the relay optical system 7 is constructed in such a way that the emitting end 6b of the light intensity equalizing element 6 and the surface to be illuminated 2b of the DMD element 2 become optically conjugate with each other. An area of the light source image 4c is denoted by S1, an area of the emitting end 6b of the light intensity equalizing element 6 is denoted by S3, and an area of the surface to be illuminated 2b of the DMD element 2 is denoted by S2. Moreover, in FIG. 2, the light source image 4c and the incident end 6a of the light intensity equalizing element 6 are drawn in such a way that their positions are different from each other, but an actual system is constructed in such a way that the position of the light source image 4c approximately coincides with the position of the incident end 6a of the light intensity equalizing element 6. When a stereoscopic angle of the light emitted from the light source image 4c is assumed to be $\Omega 1$, a stereoscopic angle of the light incident on the light intensity equalizing element 6 also becomes $\Omega 1$ and the stereoscopic angle is conserved in the light intensity equalizing element 6, so a stereoscopic angle of the light emitted from the emitting end 6b also becomes $\Omega 1$. On the other hand, when a stereoscopic angle of an incident light on the surface to be illuminated 2b of the DMD element 2 is assumed to be $\Omega 2$, the products of the area and the stereoscopic angle are held constant at the emitting end 6b and the surface to be illuminated 2b, that is, the following equation is satisfied:

$$S1 \times \Omega 1 = S2 \times \Omega 2.$$

The DMD element 2 is a device having a plurality of movable micromirrors (for example, hundreds of thousands of micromirrors) corresponding to the respective pixels arrayed in a plane and is constructed in such a way that inclination angles (tilt) of the respective micromirrors can be changed in accordance with image information. Assuming that a plane of the DMD element 2, on which the micromirrors are arranged (i.e., a surface of a substrate of the DMD element 2, on which the micromirrors are formed) is a reference plane, when the micromirror of the DMD element 2 is tilted by an angle $\alpha$ (for example, 12 degrees) in a specified direction with respect to the reference plane, the micromirror of the DMD element 2 reflects the incident light to the projecting optical system 3 and the light incident on the projecting optical system 3 is used for projecting an image onto a screen (not shown in the figure). Moreover, when the micromirror of the DMD element 2 is tilted by the angle $\alpha$ in an opposite direction with respect to the reference plane, the micromirror of the DMD element 2 reflects the incident light to a light absorbing plate (not shown in the figure) disposed at a position separate from the projecting optical system 3 and the light incident on the light absorbing plate is not used for projecting an image onto the screen.

Next, a method of determining the cross-sectional shape of the light intensity equalizing element 6 in the first embodiment (which is also the shape of the emitting end of the light intensity equalizing element 6 in the first embodiment) will be described.

Figure 3:
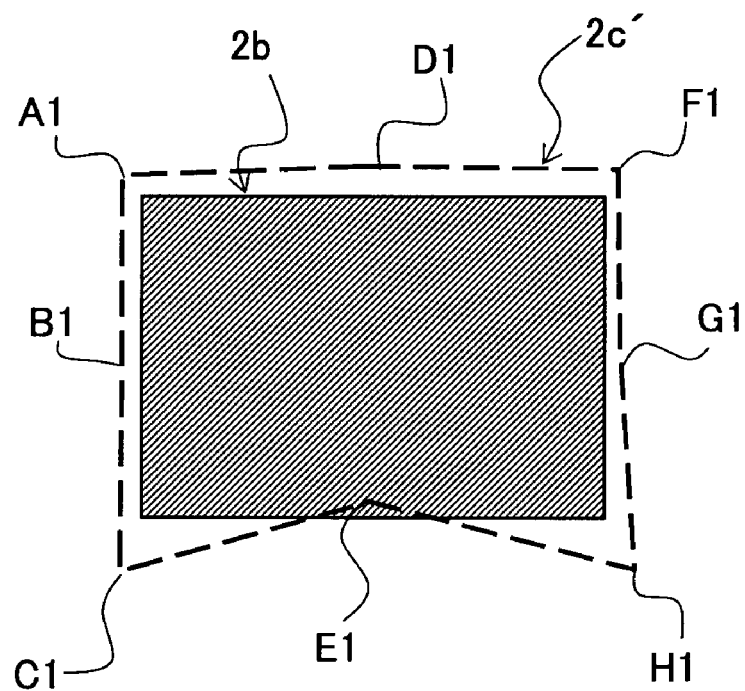
FIG. 3 is a diagram schematically showing a surface to be illuminated on the DMD element and an actual illumination area on the DMD element when a light intensity equalizing element, a cross-sectional shape of which is approximately similar to the surface to be illuminated on the DMD element, is used.
Figure 4:
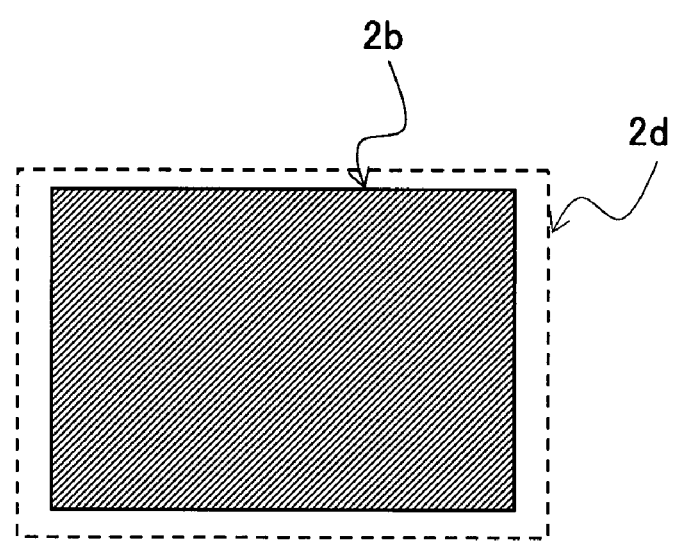
FIG. 4 is a diagram schematically showing a surface to be illuminated on the DMD element and an ideal illumination area.
Figure 5A:
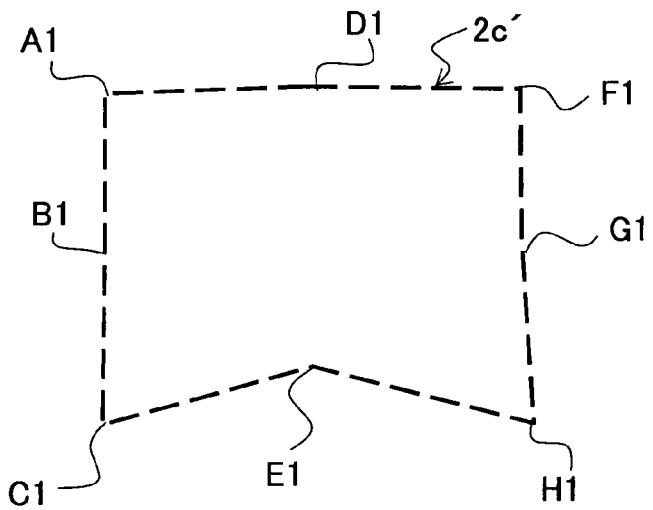
FIG. 5A is a diagram showing an actual illumination area when a reference light intensity equalizing element is used.
Figure 5B:
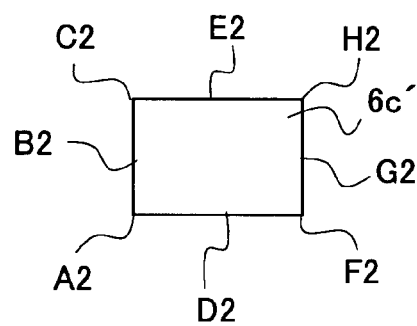
FIG. 5B is a diagram schematically showing a cross-sectional shape of the reference light intensity equalizing element.
Figure 6:
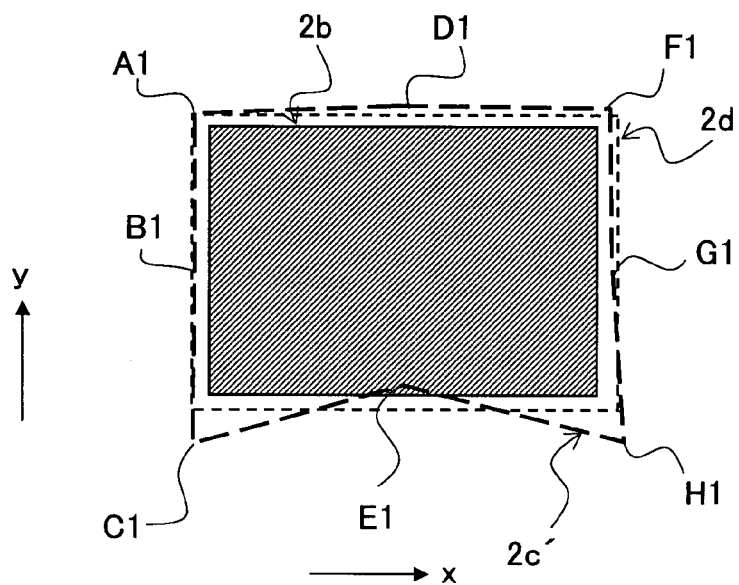
FIG. 6 is a diagram schematically showing a surface to be illuminated on the DMD element, an ideal illumination area, and an actual illumination area on the DMD element when the reference light intensity equalizing element is used.
Figure 7:
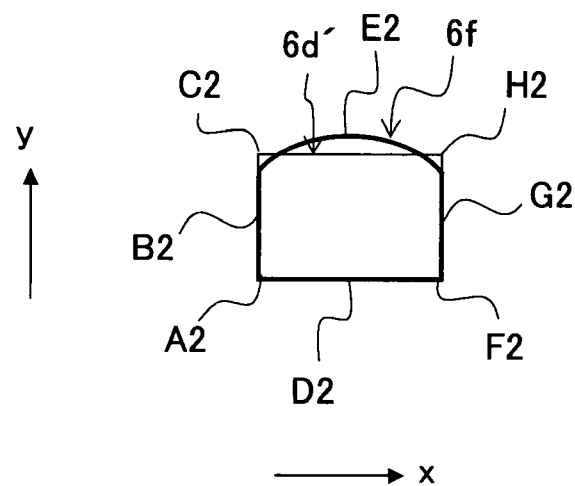
FIG. 7 is a diagram schematically showing a cross-sectional shape of the reference light intensity equalizing element and a cross-sectional shape (or a shape of the end portion) of the light intensity equalizing element in the first embodiment.
Figure 8:
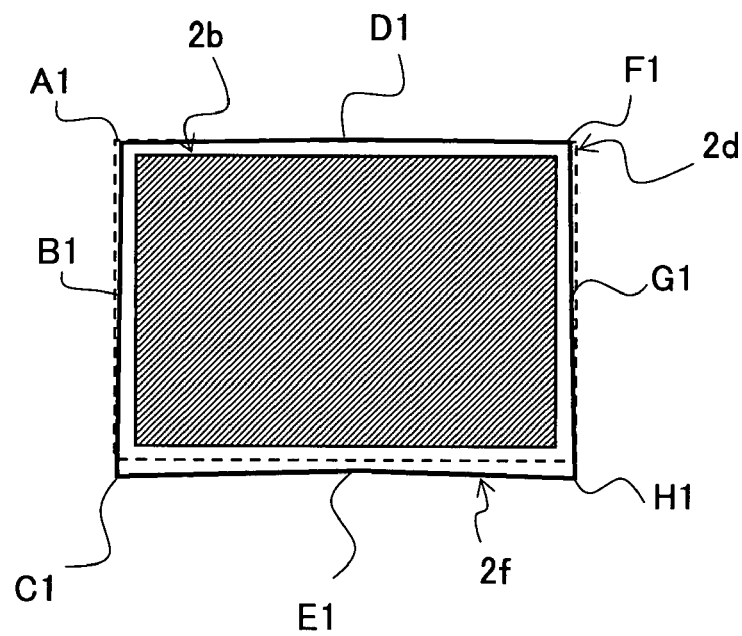
FIG. 8 is a diagram schematically showing a surface to be illuminated on the DMD element, an ideal illumination area, and an actual illumination area on the DMD element when the light intensity equalizing element in the first embodiment is used.
Figure 9:
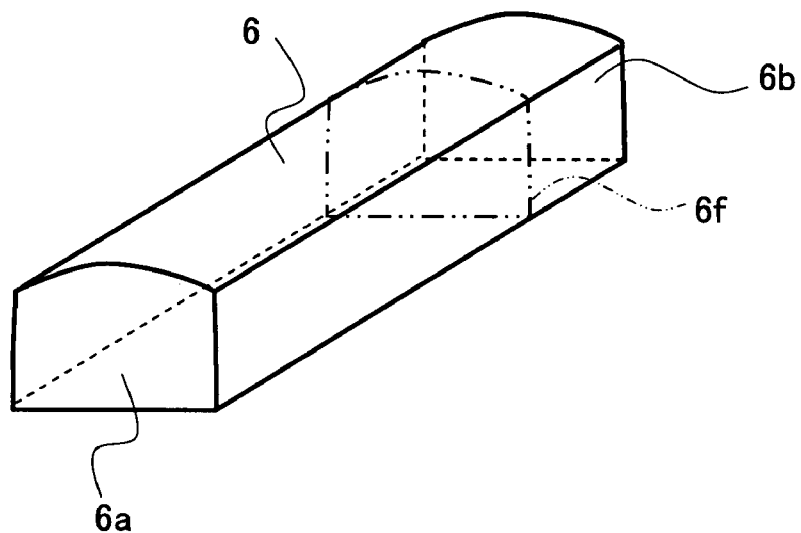
FIG. 9 is an external perspective view schematically showing the shape of the light intensity equalizing element in the first embodiment.

FIG. 3 is a diagram schematically showing the surface to be illuminated 2b (hatched area) on the DMD element 2 and an actual illumination area 2c' (i.e., an area surrounded by a polygon indicated by a broken line) on the DMD element 2 when a light intensity equalizing element, the cross-sectional shape of which is formed in the shape of a rectangle approximately similar to the surface to be illuminated 2b of the DMD element 2, is used. This light intensity equalizing element is referred to as a "reference light intensity equalizing element" in this application. Moreover, FIG. 4 is a diagram schematically showing the surface to be illuminated 2b (hatched area) on the DMD element 2 and an ideal illumination area 2d (i.e., an area surrounded by a rectangle indicated by a broken line). Further, FIG. 5A is a diagram showing the actual illumination area 2c' on the DMD element 2 when the reference light intensity equalizing element is used, and FIG. 5B is a diagram showing the cross-sectional shape 6c' of the reference light intensity equalizing element. Furthermore, FIG. 6 is a diagram conceptually showing the surface to be illuminated 2b on the DMD element 2, the ideal illumination area 2d, and the actual illumination area 2c' on the DMD element 2 when the reference light intensity equalizing element is used. Still further, FIG. 7 is a diagram schematically showing a cross-sectional shape 6d' of the reference light intensity equalizing element and a cross-sectional shape (which is also the shape of the end portion) 6f of the light intensity equalizing element 6 in the first embodiment. Still further, FIG. 8 is a diagram schematically showing the surface to be illuminated 2b on the DMD element 2, the ideal illumination area 2d, and an actual illumination area 2f on the DMD element 2 when the light intensity equalizing element 6 in the first embodiment is used. Still further, FIG. 9 is an external perspective view schematically showing the shape of the light intensity equalizing element 6 in the first embodiment.

In the illumination optical system 1 using the DMD element 2, as shown in FIG. 1, the surface to be illuminated 2b of the DMD element 2 is irradiated with the light from the second mirror 74 in a direction tilted with respect to a normal direction (i.e., an axial direction 2a in FIG. 1) vertical to the surface to be illuminated 2b of the DMD element 2. Thus, even if the design of the illumination optical system 1 is devised, distortion is often developed in an area actually illuminated (i.e., an actual illumination area) on the surface to be illuminated 2b of the DMD element 2.

There will be described an example in which an optical system is designed so as to be constructed, for example, in the manner shown in TABLE 1. This example uses the reference light intensity equalizing element, the cross-sectional shape of which is formed in the shape of a rectangle approximately similar to the shape of the surface to be illuminated 2b of the DMD element 2, and the example will be hereinafter referred to as a "reference example".

TABLE 1

| COMPONENT | EXPLANATION |
| --- | --- |
| Light Source Lamp Unit 4 | Ellipsoidal Mirror |
| Shape of Emitting End 6c' of Reference Light Intensity Equalizing Element (Cross-Sectional Shape 6d') | Rectangle of 2 mm × 3 mm |
| Relay Optical System 7 | Two Spherical Lenses, One Plane Mirror, and One Concave Spherical Mirror |
| Surface To Be Illuminated 2b of DMD Element 2 | 14.51 mm × 8.16 mm |

In the reference example, as shown in TABLE 1, the cross-sectional shape 6d' and the shape of the light emitting end 6c' (shown in FIG. 5B) of the reference light intensity equalizing element (device corresponding to the light intensity equalizing element 6 shown in FIG. 1) is formed in the shape of a rectangle approximately similar to the shape of the surface to be illuminated 2b of the DMD element 2. Moreover, the relay optical system 7 includes two spherical lenses 2, one plane mirror, and one concave spherical mirror. Further, the size of the surface to be illuminated 2b of the DMD element 2 is 14.51 mm long and 8.16 mm wide.

As shown in FIG. 3, the actual illumination area 2c' on the DMD element 2 in the reference example using the reference light intensity equalizing element is formed in a shape distorted as compared with the shape (rectangle) of the surface to be illuminated 2b on the DMD element 2. In the case of the actual illumination area 2c' distorted in this manner, depending on variations in the DMD element 2 and the optical parts or mechanism parts of the relay optical system 7, a portion having a small illumination margin in the actual illumination area 2c' may not be irradiated with the light. In this case, there is presented a problem that a dark portion is developed and is recognized as a shadow on a displayed image screen. Moreover, there is presented another problem that the light for illumination is discarded uselessly in a portion having a large illumination margin to increase a loss in the light for illumination.

As shown in FIG. 4, the ideal illumination area 2d on the DMD element 2 is, for example, a rectangular area formed so as to secure an illumination margin having a specified width in all directions with respect to the surface to be illuminated 2b on the DMD element 2. Moreover, the ideal illumination area 2d can be also made a rectangular area similar to the surface to be illuminated 2b on the DMD element 2 and including the surface to be illuminated 2b on the DMD element 2. The rectangular area of the ideal illumination area 2d is an area obtained by multiplying the surface to be illuminated 2b on the DMD element 2 by a specified scaling factor, for example, 1.03. Further, the ideal illumination area 2d can be also made a rectangular area including the surface to be illuminated 2b on the DMD element 2 and securing a margin of a width WH in a horizontal scanning direction (in a lateral direction in FIG. 4) and securing a margin of a width WV (≠WH) in a vertical scanning direction (in a longitudinal direction in FIG. 4). Even if the construction and design of the illumination optical system 1 is devised so as to bring the actual illumination area 2c' in the reference example (TABLE 1) using the reference light intensity equalizing element close to the ideal illumination area 2d, in reality, a limit is reached and distortion is left. Hence, in the first embodiment of the present invention has been made the study of optimizing the cross-sectional shape (including the shape of the end portion) of the light intensity equalizing element 6 to decrease the distortion of the actual illumination area, as shown by a reference symbol 2f in FIG. 8, to thereby bring the actual illumination area 2f close to the ideal illumination area 2d.

Here, the cross-sectional shape 6f (shown in FIG. 7) of the light intensity equalizing element 6 in the first embodiment will be described. In FIG. 5A, there are shown points A1, B1, C1, D1, E1, F1, G1, and H1 of eight points (four corners A1, C1, F1, and H1 and four middle points B1, D1, E1, and G1 of lines connecting the neighboring corners) of the actual illumination area 2c' when viewed from the front of the surface to be illuminated 2b of the DMD element 2 in the reference example shown in TABLE 1. In FIG. 5B, there are shown points A2, B2, C2, D2, E2, F2, G2, and H2 of eight points (four corners and four middle points of lines connecting the neighboring corners) of the cross-sectional shape 6c' when viewed from the front of the emitting end of the light intensity equalizing element, which correspond to the points A1, B1, C1, D1, E1, F1, G1, and H1 shown in FIG. 5A, respectively.

The points A1, B1, C1, D1, E1, F1, G1, and H1 of the actual illumination area 2c' on the DMD element 2 shown in FIG. 5A correspond to the points A2, B2, C2, D2, E2, F2, G2, and H2 of the cross-sectional shape 6c' of the reference light intensity equalizing element, respectively.

As described above, in the reference example (TABLE 1) using the reference light intensity equalizing element, the actual illumination area 2f on the DMD element 2 can be brought close to the ideal illumination area 2d. The cross-sectional shape 6d of the light intensity equalizing element 6 in the first embodiment will be described below. As shown in FIG. 6, the size of the surface to be illuminated 2b of the DMD element 2 is 14.51 mm long and 8.16 mm wide. A design margin is set for 3% by way of example to make the ideal illumination area 2d be 15.24 mm long and 8.57 mm wide. In order to show the degree of distortion of the actual illumination area 2c' in the reference example (TABLE 1) using the reference light intensity equalizing element as shown in FIG. 6, the comparison result of the ideal illumination area 2d and the actual illumination area 2c' is shown in TABLE 2.

TABLE 2

|  | x | y | x | y | x | y | x | y |
|---|---|---|---|---|---|---|---|---|
|  | A1 | | B1 | | C1 | | D1 | |
| Ideal Illumination Area 2d | 1 | 1 | 1 | 1 | 1 | 1 | 1 | 1 |
| Actual Illumination Area 2c' | 1.01 | 1.00 | 1.03 | 1.00 | 1.03 | 1.16 | 1.00 | 1.06 |
|  | E1 | | F1 | | G1 | | H1 | |
| Ideal Illumination Area 2d | 1 | 1 | 1 | 1 | 1 | 1 | 1 | 1 |
| Actual Illumination Area 2c' | 1.00 | 0.96 | 1.01 | 1.00 | 1.03 | 1.00 | 1.03 | 1.16 |

In FIG. 6 and TABLE 1, an x direction denotes a longitudinal direction of the DMD element 2 and a y direction denotes a lateral direction of the DMD element 2. In the reference example, when the reference light intensity equalizing element is formed in the shape of a rectangle of 2 mm long and 3 mm wide (TABLE 1), positions at which the surface to be illuminated 2b of the DMD element 2 is irradiated with light emitted from points A2, B2, C2, D2, E2, F2, G2, and H2 of the corners of the cross-sectional shape of the reference light intensity equalizing element and the middle points of lines connecting the neighboring corners are denoted by the points A1, B1, C1, D1, E1, F1, G1, and H1, respectively. When the width (x direction) and height (y direction) of the ideal illumination area 2d in TABLE 2 (i.e., an area for which a design margin of 3% is set to the surface to be illuminated 2b on the DMD element 2) are assumed to be 1, the positions of the eight points in the actual illumination area 2c' are shown in TABLE 2 by relative values in the x direction and in the y direction.

In TABLE 2, the point A1 of the position reached by light in the actual illumination area 2c' is 1% larger in the x direction than that in the ideal illumination area 2d and is equal in the y direction to that in the ideal illumination area 2d, that is, it can be found that the point A1 of the position reached by light in the actual illumination area 2c' is approximately located at an ideal position. On the other hand, the point C1 of the position reached by light in the actual illumination area 2c' is 3% larger in the x direction and 16% larger in the y direction than that in the ideal illumination area 2d, that is, it can be found that the point C1 of the position reached by light in the actual illumination area 2c' is greatly shifted from the ideal position (in other words, the actual illumination area becomes considerably larger than the ideal illumination area). Similarly, also the point H1 of the position reached by light in the actual illumination area 2c' is located at a position separate from that in the ideal illumination area 2d.

A method of actually bringing the distorted actual illumination area 2c' shown in FIG. 6 and TABLE 1 close to the ideal illumination area 2d will be described. In a basic idea, the light intensity equalizing element 6 is formed in a polygonal shape constructed in such a way that the points of A2, B2, C2, D2, E2, F2, G2, and H2 of the light intensity equalizing element 6, which correspond to the points A1, B1, C1, D1, E1, F1, G1, and H1 of points of the corners of the actual illumination area 2c' on the DMD element 2 and the middle points of lines connecting the neighboring corners, form the polygonal shape for correcting the actual illumination area 2c' on the DMD element 2.

In FIG. 7, there are shown the cross-sectional shape 6d' of the reference light intensity equalizing element shown in TABLE 1 and the cross-sectional shape 6f of the light intensity equalizing element 6 after correction (i.e., in the first embodiment of the present invention). The cross-sectional shapes 6d' and 6f shown in FIG. 7 are the shapes when viewed from the front of the emitting end 6b of the light intensity equalizing element 6.

As for a method of determining the cross-sectional shape 6f of the light intensity equalizing element 6 after correction, theoretically, it suffices to form the cross-sectional shape 6f of the light intensity equalizing element 6 in a shape to cancel the distortion of the actual illumination area 2c' of the DMD element 2 when the DMD element 2 is irradiated with the light of the cross-sectional shape 6d' of the reference light intensity equalizing element. That is, the cross-sectional shape 6f of the light intensity equalizing element 6 needs to be formed in a shape to correct the lower portion (points C1, E1, and H1) where the distortion is large in the actual illumination area 2c' shown in FIG. 6. In TABLE 3, the corrected positions of the respective points of the cross-sectional shape 6f of the light intensity equalizing element 6, which is corrected so as to cancel the distortion of the actual illumination area 2c' in the reference example shown in TABLE 2, are shown as relative values (ratios) when the points of the corners and the middle points of lines connecting the neighboring corners of the cross-sectional shape 6d' of the reference light intensity equalizing element are assumed to be 1, respectively, and when the longitudinal direction and the lateral direction of the light intensity equalizing element 6 are assumed to be the x direction and the y direction, as in the case of TABLE 2.

TABLE 3

|  | x | y | x | y | x | y | x | y |
|---|---|---|---|---|---|---|---|---|
|  | A2 | | B2 | | C2 | | D2 | |
| Cross-Sectional Shape 6d' of Reference Light Intensity Equalizing Element | 1 | 1 | 1 | 1 | 1 | 1 | 1 | 1 |
| Corrected Cross-Sectional Shape 6f of Light Intensity Equalizing Element of First Embodiment | 1 | 1 | 1 | 1 | 1 | 0.9 | 1 | 1.1 |

TABLE 3-continued

| | E2 x | E2 y | F2 x | F2 y | G2 x | G2 y | H2 x | H2 y |
|---|---|---|---|---|---|---|---|---|
| Cross-Sectional Shape 6d' of Reference Light Intensity Equalizing Element | 1 | 1 | 1 | 1 | 1 | 1 | 1 | 1 |
| Corrected Cross-Sectional Shape 6f of Light Intensity Equalizing Element of First Embodiment | 1 | 1 | 1 | 1 | 1 | 1 | 1 | 0.9 |

In the actual design, it is preferable that the cross-sectional shape 6f of the light intensity equalizing element 6 is determined also in consideration of the performance of the illumination optical system 1 and the performance of the projecting optical system 3. In TABLE 3, there is shown the corrected cross-sectional shape 6f of the light intensity equalizing element 6 in the first embodiment. As for the cross-sectional shape 6f, there has been made a study of the cross-sectional shape 6f capable of correcting the points C1, E1, and H1 where the difference between the actual illumination area 2c' and the ideal illumination area 2d is especially large in TABLE 2. In FIG. 8, there is shown the illumination area 2f of the DMD element 2 when the DMD element 2 is irradiated with the light emitted from the light intensity equalizing element 6 having the corrected cross-sectional shape 6f.

In FIG. 8, it can be found that the illumination area 2f, which is formed when the DMD element 2 is irradiated with the light emitted from the light intensity equalizing element 6 having the corrected cross-sectional shape 6f, is formed in a shape extremely close to the ideal illumination area 2d. The shape of the light intensity equalizing element 6 in this case is shown in FIG. 9. The light intensity equalizing element 6 has its cross-sectional shape from the incident end 6a to the emitting end 6b formed in a polygonal shape in which one side (an upper side in FIG. 9) is a curved shape 6f projecting in the shape of an arc. Here, among the sides of the cross-sectional shape, the number of sides formed in the curved shape of an arc is not necessarily limited to one.

In the first embodiment, the light intensity equalizing element 6 as shown in FIG. 9 is used. Thus, as compared with a case in which a light intensity equalizing element having a rectangular cross-sectional shape approximately similar to the surface to be illuminated 2b of the DMD element 2 is used, the surface to be illuminated 2b of the DMD element 2 is adapted to secure a specified design margin in all directions, thereby being formed into a shape close to an ideal illumination area 6c. Hence, light use efficiency can be increased and the defect of developing a dark portion on the screen can be also prevented.

Moreover, in the first embodiment, the pixels of the reflective light valve 2 are constructed of the movable micromirrors, respectively, each of which can change the inclination angle of a reflective plane, so an intensity distribution in the cross section of the light for illumination can be made uniform and hence unevenness in illuminance can be prevented.

Further, in the first embodiment, when the light intensity equalizing element 6 includes the cylindrical member so as to reflect the light by its internal surface, the light intensity equalizing element 6 itself is less easily heated by the light and hence can be easily cooled and easily mounted in the apparatus.

Furthermore, in the first embodiment, the light intensity equalizing element 6 includes a quadrilateral pillar-shaped member made of a transparent material, so the light intensity equalizing element 6 can be easily designed and manufactured.

Figure 10:
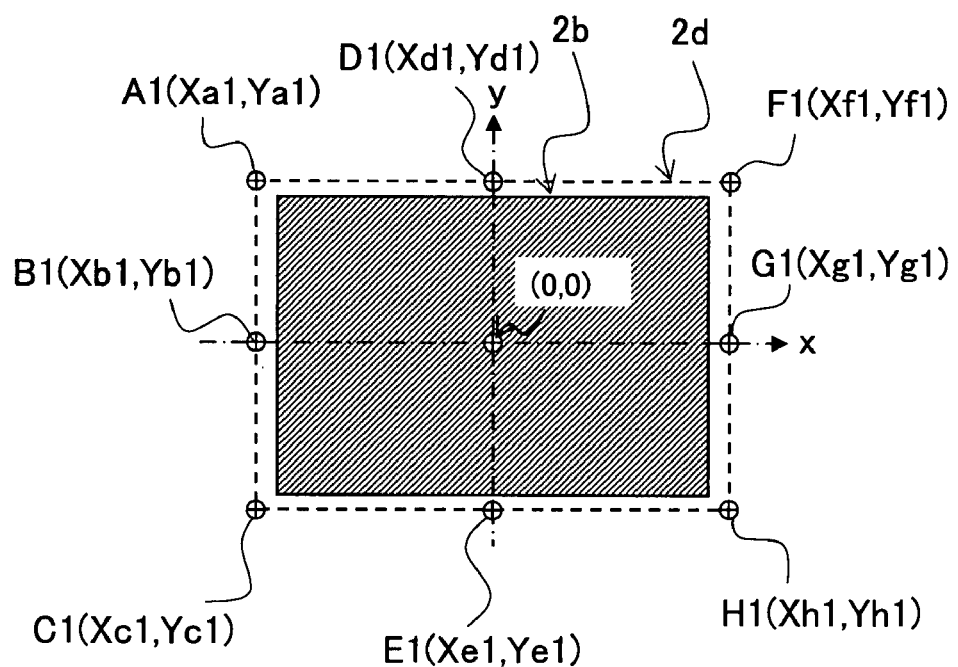
FIG. 10 is a diagram showing a surface to be illuminated on the DMD element in the first embodiment of the present invention and an ideal illumination area on a rectangular coordinate system having an origin at the center of the surface to be illuminated.
Figure 11:
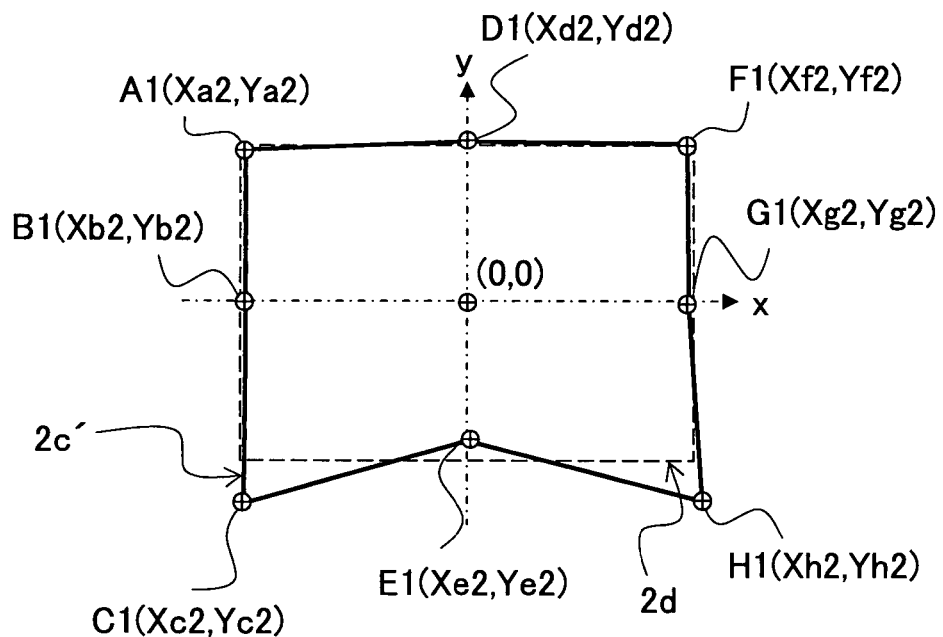
FIG. 11 is a diagram showing an ideal illumination area on the DMD element in the first embodiment and an actual illumination area on the DMD element when the reference light intensity equalizing element is used on the rectangular coordinate system having an origin at the center of the surface to be illuminated.
Figure 12:
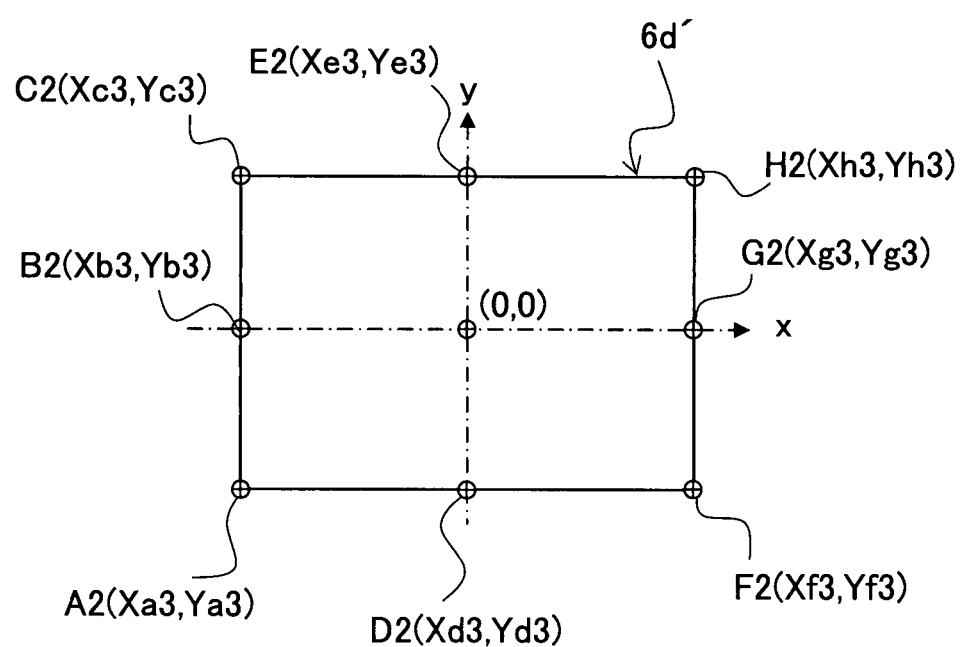
FIG. 12 is a diagram showing a cross-sectional shape of the reference light intensity equalizing element on a rectangular coordinate system having an origin at its center.
Figure 13:
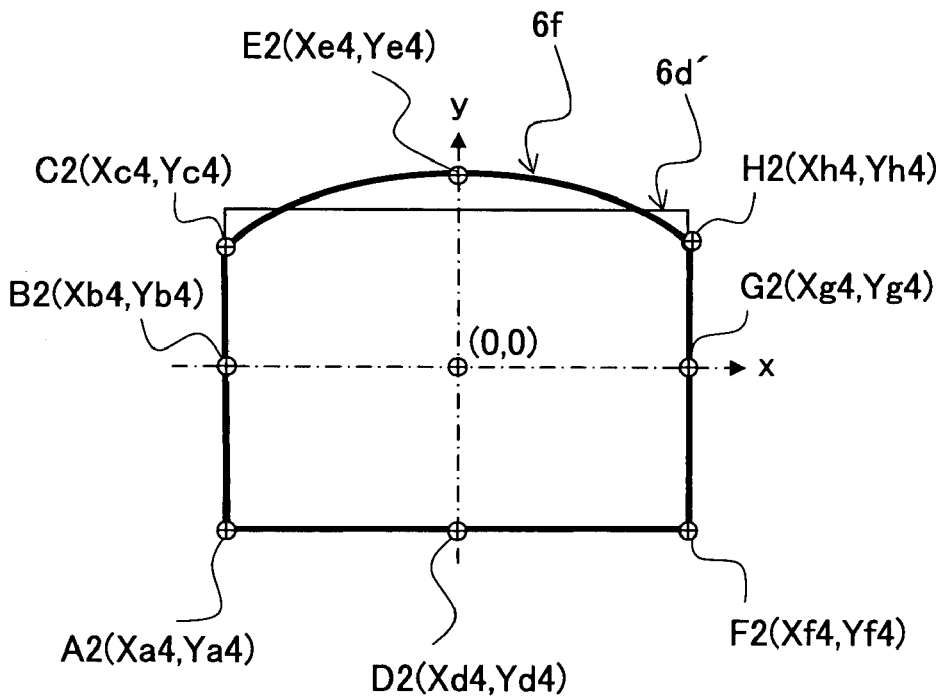
FIG. 13 is a diagram showing a cross-sectional shape of the reference light intensity equalizing element and a cross-sectional shape of the light intensity equalizing element in the first embodiment on the rectangular coordinate system having an origin at the center of the cross-sectional shape of the reference light intensity equalizing element.

FIG. 10 is a diagram showing the surface to be illuminated 2b (hatched area) on the DMD element 2 in the first embodiment of the present invention and the ideal illumination area 2d (i.e., an area surrounded by a broken line) on a rectangular coordinate system having an origin at the center of the surface to be illuminated 2b. Moreover, FIG. 11 is a diagram showing the ideal illumination area 2d (i.e., an area surrounded by a broken line) in the first embodiment of the present invention and the actual illumination area (i.e., an area surrounded by a solid line) on the DMD element 2 when the reference light intensity equalizing element is used on the rectangular coordinate system. Further, FIG. 12 is a diagram showing the cross-sectional shape of the reference light intensity equalizing element and the rectangular coordinate system. Furthermore, FIG. 13 is a diagram showing the cross-sectional shape of the reference light intensity equalizing element and the cross-sectional shape of the light intensity equalizing element 6 in the first embodiment on the rectangular coordinate system.

In FIG. 10 to FIG. 13, a method of determining the cross-sectional shape (including the shape of the end portion) of the light intensity equalizing element 6 is more specifically specified.

As shown in FIG. 10 to FIG. 13, there is used a coordinate system that has an origin (coordinates (0, 0)) at the center of the surface to be illuminated (i.e., an image forming area) 2b of the DMD element 2 and takes an x axis and a y axis in a horizontal scanning direction and in a vertical scanning direction, respectively, in a plane orthogonal to the central light ray.

In this coordinate system, $(Xa1, Ya1)$, $(Xc1, Yc1)$, $(Xf1, Yf1)$, and $(Xh1, Yh1)$ are coordinates of the corners of the ideal illumination area 2d on the DMD element 2 respectively, and $(Xb1, Yb1)$, $(Xd1, Yd1)$, $(Xe1, Ye1)$, and $(Xg1, Yg1)$ are coordinates of the middle points of the sides of the ideal illumination area 2d on the DMD element 2 respectively.

Moreover, $(Xa2, Ya2)$, $(Xc2, Yc2)$, $(Xf2, Yf2)$, and $(Xh2, Yh2)$ are coordinates of the corners of the actual illumination area 2c' on the DMD element 2 respectively when the DMD element 2 is used, and $(Xb2, Yb2)$, $(Xd2, Yd2)$, $(Xe2, Ye2)$, and $(Xg2, Yg2)$ are coordinates of the middle points of the sides of the actual illumination area on the DMD element 2 respectively when the DMD element 2 is used.

Further, $(Xa3, Ya3)$, $(Xc3, Yc3)$, $(Xf3, Yf3)$, and $(Xh3, Yh3)$ are coordinates of the corners of the cross-sectional shape of the reference light intensity equalizing element respectively, and $(Xb3, Yb3)$, $(Xd3, Yd3)$, $(Xe3, Ye3)$, and $(Xg3, Yg3)$ are coordinates of the middle points of the sides of the cross-sectional shape of the reference light intensity equalizing element respectively.

Furthermore, $(Xa4, Ya4)$, $(Xc4, Yc4)$, $(Xf4, Yf4)$, and $(Xh4, Yh4)$ are coordinates of the corners of the cross-sectional shape 6f (or the emitting end surface) of the light intensity equalizing element 6 respectively, and $(Xb4, Yb4)$, $(Xd4, Yd4)$, $(Xe4, Ye4)$, and $(Xg4, Yg4)$ are coordinates of the middle points of the sides of the cross-sectional shape 6f (or the emitting end surface) of the light intensity equalizing element 6 respectively.

In this case, in the projection display apparatus according to the first embodiment, the cross-sectional shape 6f (or the emitting end surface) of the light intensity equalizing element 6 is determined so as to satisfy the following condition equations 1 to 12.

$$0.9\times(|Xa1|/|Xa2|)<(|Xa4|/|Xa3|)<1.25\times(|Xa1|/|Xa2|) \quad \text{Equation 1}$$

$$0.9\times(|Xb1|/|Xb2|)<(|Xb4|/|Xb3|)<1.25\times(|Xb1|/|Xb2|) \quad \text{Equation 2}$$

$$0.9\times(|Xc1|/|Xc2|)<(|Xc4|/|Xc3|)<1.25\times(|Xc1|/|Xc2|) \quad \text{Equation 3}$$

$$0.9\times(|Xf1|/|Xf2|)<(|Xf4|/|Xf3|)<1.25\times(|Xf1|/|Xf2|) \quad \text{Equation 4}$$

$$0.9\times(|Xg1|/|Xg2|)<(|Xg4|/|Xg3|)<1.25\times(|Xg1|/|Xg2|) \quad \text{Equation 5}$$

$$0.9\times(|Xh1|/|Xh2|)<(|Xh4|/|Xh3|)<1.25\times(|Xh1|/|Xh2|) \quad \text{Equation 6}$$

$$0.9\times(|Ya1|/|Ya2|)<(|Ya4|/|Ya3|)<1.25\times(|Ya1|/|Ya2|) \quad \text{Equation 7}$$

$$0.9\times(|Yc1|/|Yc2|)<(|Yc4|/|Yc3|)<1.25\times(|Yc1|/|Yc2|) \quad \text{Equation 8}$$

$$0.9\times(|Yd1|/|Yd2|)<(|Yd4|/|Yd3|)<1.25\times(|Yd1|/|Yd2|) \quad \text{Equation 9}$$

$$0.9\times(|Ye1|/|Ye2|)<(|Ye4|/|Ye3|)<1.25\times(|Ye1|/|Ye2|) \quad \text{Equation 10}$$

$$0.9\times(|Yf1|/|Yf2|)<(|Yf4|/|Yf3|)<1.25\times(|Yf1|/|Yf2|) \quad \text{Equation 11}$$

$$0.9\times(|Yh1|/|Yh2|)<(|Yh4|/|Yh3|)<1.25\times(|Yh1|/|Yh2|) \quad \text{Equation 12}$$

When rates of sizes of the cross-sectional shape of the light intensity equalizing element 6 of the first embodiment to the sizes of the cross-sectional shape of the reference light intensity equalizing element become smaller than lower limits in the condition equations 1 to 12, the actual illumination area on the DMD element 2 becomes small and hence a phenomenon that a portion on the projection screen becomes dark is easily developed. Moreover, when the rates of the sizes of the cross-sectional shape of the light intensity equalizing element 6 of the first embodiment to the sizes of the cross-sectional shape of the reference light intensity equalizing element become larger than the upper limits in the condition equations 1 to 12, the light not to be used for projecting an image is increased, whereby light use efficiency is greatly decreased.

According to the projection display apparatus of the first embodiment, even when the image forming area 2b of the DMD element 2 cannot be irradiated with the light, the actual illumination area 2f can be surely made to correspond approximately to the ideal illumination area 2d, which results in producing the effect of improving light use efficiency and uniformity in an illumination distribution.

Second Embodiment

Figure 14:
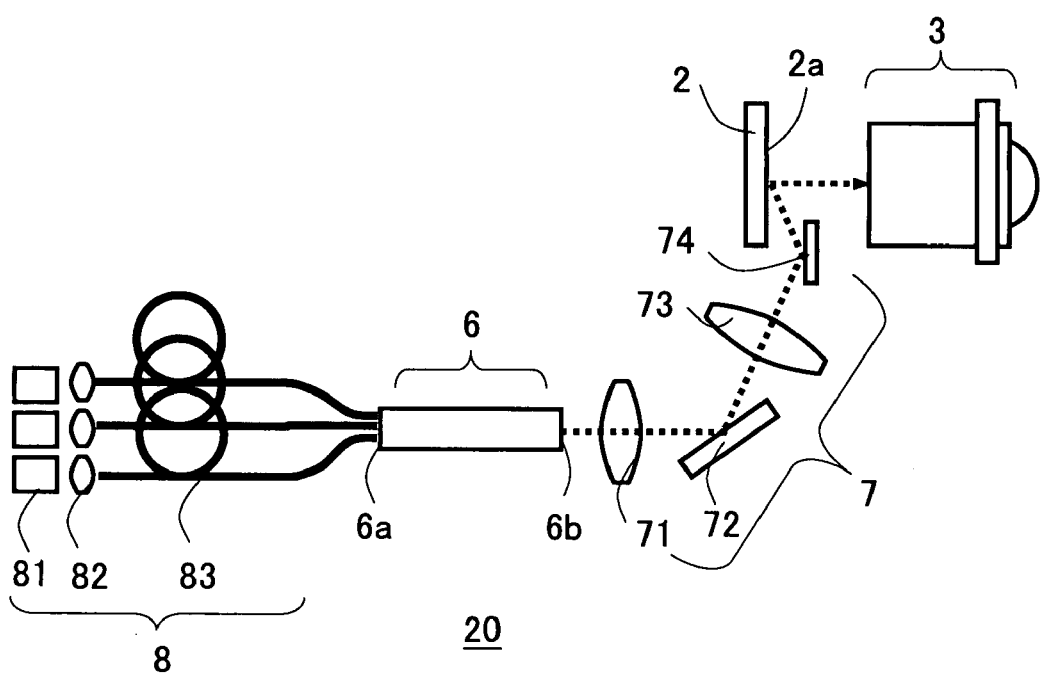
FIG. 14 is a diagram schematically showing a configuration of a light source part in the second embodiment of the present invention.

FIG. 14 is a diagram schematically showing a configuration of an optical system of a projection display apparatus according to the second embodiment of the present invention.

In FIG. 14, the constituent elements that are the same as or correspond to those in FIG. 1 (first embodiment) are assigned the same reference numerals or symbols. As shown in FIG. 14, the projection display apparatus according to the second embodiment is different from that according to the first embodiment in that the light source lamp unit 4 and the color filter 5 in the first embodiment is replaced by a laser light source optical system 8 using a laser light source. Except for this point, the projection display apparatus according to the second embodiment is the same as that according to the first embodiment.

As shown in FIG. 14, the laser light source optical system 8 includes a plurality of colors (three colors, in FIG. 14) of laser light sources 81, a plurality of (three, in FIG. 14) light collecting means 82 each constructed of one or a plurality of lenses or mirrors, and a plurality of (three, in FIG. 14) fibers 83 for introducing the light emitted from the light collecting means 82 into the light intensity equalizing element 6.

Light from the laser light sources 81 and the DMD element 2 is directly modulated by the use of the laser light source optical system 8, so the color filter 5 shown in FIG. 1 does not need to be provided. For this reason, according to the projection display apparatus in accordance with the second embodiment, light use efficiency can be increased and the price of the apparatus can be decreased.

Further, the light from the laser light sources 81 is introduced into the fibers 83, so the capture efficiency of the light at the incident end 6a of the light intensity equalizing element 6 can be increased. With this, even when the light intensity equalizing element 6 of the shape shown in FIG. 9 is formed of resin, the effect of heat can be reduced and hence a cooling structure can be simplified.

DESCRIPTION OF MODIFICATIONS

In the foregoing descriptions, there have been described cases in which the DMD element is used as the reflective light valve, but other light valves such as a reflective liquid crystal display device may be used.

Moreover, the construction of arranging the laser light sources 81 has been shown in the foregoing description, but the same effect can be produced even when light emitting diodes are used.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A projection display apparatus comprising:
a light source;
a light intensity equalizing element which equalizes an intensity distribution of light emitted from the light source;
a reflective light valve having a rectangular image forming area;
a relay optical system which introduces the light emitted from the light intensity equalizing element into the reflective light valve; and
a projecting optical system which magnifies and projects an image formed in the image forming area of the reflective light valve;
the light intensity equalizing element being an optical device in which a cross-sectional shape in a direction orthogonal to a central axis of the light has four corners;
the cross-sectional shape of the light intensity equalizing element being determined in accordance with a rectangular ideal illumination area determined so as to include the image forming area on the reflective light valve, an illumination area on the reflective light valve when a reference light intensity equalizing element is assumed to be used, the reference light intensity equalizing element being rectangular in a cross-sectional shape in a direction orthogonal to the central light ray, and the cross-sectional shape of the reference light intensity equalizing element;
wherein following equations are satisfied $$0.9\times(|Xa1|/|Xa2|)<(|Xa4|/|Xa3|)<1.25\times(|Xa1|/|Xa2|)$$

$$0.9\times(|Xb1|/|Xb2|)<(|Xb4|/|Xb3|)<1.25\times(|Xb1|/|Xb2|)$$

$$0.9\times(|Xc1|/|Xc2|)<(|Xc4|/|Xc3|)<1.25\times(|Xc1|/|Xc2|)$$

$$0.9\times(|Xf1|/|Xf2|)<(|Xf4|/|Xf3|)<1.25\times(|Xf1|/|Xf2|)$$

$$0.9\times(|Xg1|/|Xg2|)<(|Xg4|/|Xg3|)<1.25\times(|Xg1|/|Xg2|)$$

$$0.9\times(|Xh1|/|Xh2|)<(|Xh4|/|Xh3|)<1.25\times(|Xh1|/|Xh2|)$$

$$0.9\times(|Ya1|/|Ya2|)<(|Ya4|/|Ya3|)<1.25\times(|Ya1|/|Ya2|)$$

$$0.9\times(|Yc1|/|Yc2|)<(|Yc4|/|Yc3|)<1.25\times(|Yc1|/|Yc2|)$$

$$0.9\times(|Yd1|/|Yd2|)<(|Yd4|/|Yd3|)<1.25\times(|Yd1|/|Yd2|)$$

$$0.9\times(|Ye1|/|Ye2|)<(|Ye4|/|Ye3|)<1.25\times(|Ye1|/|Ye2|)$$

$$0.9\times(|Yf1|/|Yf2|)<(|Yf4|/|Yf3|)<1.25\times(|Yf1|/|Yf2|)$$

$$0.9\times(|Yh1|/|Yh2|)<(|Yh4|/|Yh3|)<1.25\times(|Yh1|/|Yh2|)$$

where, in a coordinate system having an origin at a center of the image forming area of the reflective light valve and taking an x axis and a y axis in a horizontal scanning direction and in a vertical scanning direction respectively, (Xa1, Ya1), (Xc1, Yc1), (Xf1, Yf1), and (Xh1, Yh1) are coordinates of corners of the ideal illumination area on the reflective light valve respectively, (Xb1, Yb1), (Xd1, Yd1), (Xe1, Ye1), and (Xg1, Yg1) are coordinates of middle points of sides of the ideal illumination area on the reflective light valve respectively, (Xa2, Ya2), (Xc2, Yc2), (Xf2, Yf2), and (Xh2, Yh2) are coordinates of corners of an actual illumination area on the reflective light valve respectively, when the reference light intensity equalizing element is assumed to be used, (Xb2, Yb2), (Xd2, Yd2), (Xe2, Ye2), and (Xg2, Yg2) are coordinates of middle points of sides of the actual illumination area on the reflective light valve respectively, when the reference light intensity equalizing element is assumed to be used, (Xa3, Ya3), (Xc3, Yc3), (Xf3, Yf3), and (Xh3, Yh3) are coordinates of corners of a cross-sectional shape of the reference light intensity equalizing element respectively, (Xb3, Yb3), (Xd3, Yd3), (Xe3, Ye3), and (Xg3, Yg3) are coordinates of middle points of sides of the cross-sectional shape of the reference light intensity equalizing element respectively, (Xa4, Ya4), (Xc4, Yc4), (Xf4, Yf4), and (Xh4, Yh4) are coordinates of corners of a cross-sectional shape of the light intensity equalizing element respectively, and (Xb4, Yb4), (Xd4, Yd4), (Xe4, Ye4), and (Xg4, Yg4) are coordinates of middle points of sides of the cross-sectional shape of the light intensity equalizing element respectively.

2. The projection display apparatus according to claim 1, wherein at least one of the sides of the cross-sectional shape of the light intensity equalizing element is an arc-shaped curved line.

3. The projection display apparatus according to claim 1, wherein the light intensity equalizing element is a tubular member and is constructed so as to reflect the light by internal surfaces of the tubular member.

4. The projection display apparatus according to claim 1, wherein the light intensity equalizing element is a polygonal pillar-shaped member and is constructed so as to reflect the light in interior of the polygonal pillar-shaped member.

5. The projection display apparatus according to claim 1, wherein the light source is a laser light source.

6. The projection display apparatus according to claim 1, wherein the light source is a light emitting diode.

7. The projection display apparatus according to claim 1, wherein the reflective light valve has a plurality of micromirrors each of which can change a titling angle of a reflective plane.

* * * * *